2,805,155
Patented Sept. 3, 1957

2,805,155
HIGH TEMPERATURE BRAZING ALLOYS

Amiel Gelb and George E. Korb, Indianapolis, Ind., assignors to Stewart-Warner Corporation, Chicago, Ill., a corporation of Virginia No Drawing. Application October 1, 1956, Serial No. 612,980

10 Claims. (Cl. 75—173)

The invention relates generally to brazing alloys, and more particularly to an alloy which may be used to join parts of an apparatus which is to be operated at high temperatures.

Difficulty has been encountered in endeavoring to join thin sections of stainless steel for applications where high temperatures from 500° F. to 1500° F. are encountered. Many of the alloys now being used for brazing stainless steel are not suitable for very thin sections, because the brazing material diffuses into the grain boundaries of the parent metal and the resulting undercutting causes early joint failures.

It is therefore an object of the invention to provide an improved high temperature brazing alloy, with good oxidation and corrosion resistance equal to that of the thin section of the joined materials, and one which does not undercut the parent material in the brazing process or in the post-brazing exposure, which makes it particularly adaptable for brazing thin stainless steel materials of the order of 0.005 inch or less. Materials as thin as 0.0015 inch have been successfully brazed with the alloy described herein.

For example, in assembling the stainless steel sheet metal parts of heat exchanger apparatus in which the parts and the brazing alloy at the joints between the parts are subjected to very high temperature, with the possibility of failure of the brazed joint due to the oxidation, corrosion, and diffusion of the brazing alloy, it has been found that an alloy containing silver, 88% to 97%; platinum and palladium, or either of these elements, 2% to 10%, nickel and cobalt, or either of these elements, a maximum of 1%, is highly satisfactory, and that other elements, such as lithium, in the amount of 0.5% may be added for improvement of the flow and wetting characteristics of the alloy.

A specific example of an alloy which has been found to be excellent for use in brazing thin section stainless steel parts of heat exchangers, which may be subjected to temperatures as high as 1500° F., is as follows:

| | Percent |
|---|---|
| Silver | 93.7 |
| Palladium | 4 |
| Platinum | 2 |
| Nickel | 0.2 |
| Lithium | 0.1 |

As above indicated, the lithium may be omitted, but its addition improves the wetting and flow characteristics of the alloy.

Whether the noble metal employed in this alloy is platinum or palladium, or whether some of each of these elements is used, is not controlling, but the use of approximately 2% of platinum, with about 5% of palladium, has been found desirable in order to improve the heat resistance characteristic of the alloy, but the relative percentages of these two ingredients may be varied through a considerable range without changing appreciably the advantages of the use of the alloy under conditions where it is subjected to very high temperatures, and the proportion employed is controlled in part by the relative cost of palladium and platinum.

The invention claimed is:

1. A brazing alloy consisting essentially of about 88% to 97% silver, about 2% to 10% of a member selected from a group consisting of platinum, palladium and mixtures thereof, from about .1% to 1% of a member selected from a group consisting of nickel, cobalt and mixtures thereof.

2. An alloy for brazing, having the composition set forth in claim 1, and additionally including a maximum of 0.5% of lithium for improving the flow and wetting characteristics of the alloy.

3. An alloy for brazing, consisting essentially of about 93.8% silver, about 4% palladium, about 2% platinum, and 0.2% nickel.

4. The alloy composition set forth in claim 3, in which there is included about 0.1% of lithium.

5. A brazing alloy consisting essentially of about 88% to 97% silver, about 2% to 10% of palladium, and from about .1% to 1% of a member selected from a group consisting of nickel, cobalt and mixtures thereof.

6. An alloy for brazing, having the composition set forth in claim 5, and additionally including a maximum of 0.5% of lithium for improving the flow characteristics of the alloy.

7. An alloy for brazing and the like, consisting essentially of about 93.8% silver, about 4% palladium, about 2% platinum, and about 0.2% cobalt.

8. The alloy composition set forth in claim 7, in which there is included about 0.1% of lithium.

9. A brazing alloy consisting essentially of about 88% to 97% silver, about 2% to 10% of platinum, and from about .1% to 1% of a member selected from a group consisting of nickel, cobalt and mixtures thereof.

10. An alloy for brazing, having the composition set forth in claim 9, and additionally including a maximum of 0.5% of lithium for improving the flow characteristics of the alloy.

References Cited in the file of this patent

UNITED STATES PATENTS

| | | |
|---|---|---|
| 1,166,129 | Heyl | Dec. 28, 1915 |
| 2,196,306 | Hensel et al. | Dec. 13, 1939 |
| 2,450,340 | Hensel et al. | Sept. 28, 1948 |
| 2,654,946 | Rhodes et al. | Oct. 13, 1953 |
| 2,793,115 | Bredzs | May 21, 1957 |